United States Patent
Xiao et al.

(10) Patent No.: US 12,172,930 B2
(45) Date of Patent: Dec. 24, 2024

(54) PREPARATION METHOD AND USE OF YELLOW FLUORESCENT GLASS CERAMIC

(71) Applicant: ZHEJIANG UNIVERSITY, Hangzhou (CN)

(72) Inventors: Wenge Xiao, Hangzhou (CN); Chang Liu, Hangzhou (CN); Jianrong Qiu, Hangzhou (CN); Xiaofeng Liu, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 643 days.

(21) Appl. No.: 17/420,725

(22) PCT Filed: Nov. 29, 2019

(86) PCT No.: PCT/CN2019/122037
§ 371 (c)(1),
(2) Date: Jul. 6, 2021

(87) PCT Pub. No.: WO2020/228300
PCT Pub. Date: Nov. 19, 2020

(65) Prior Publication Data
US 2022/0064053 A1      Mar. 3, 2022

(30) Foreign Application Priority Data

May 15, 2019    (CN) .......................... 201910400469.7

(51) Int. Cl.
*C04B 35/14*     (2006.01)
*B29C 35/08*     (2006.01)
(Continued)

(52) U.S. Cl.
CPC .............. *C04B 35/14* (2013.01); *B29C 35/08* (2013.01); *B29C 39/003* (2013.01); *B29C 70/58* (2013.01);
(Continued)

(58) Field of Classification Search
None
See application file for complete search history.

(56) References Cited

U.S. PATENT DOCUMENTS 9,260,340 B2 *   2/2016   Zhou .................... C03C 14/006

OTHER PUBLICATIONS

Liu, Chang, et al. "Additive manufacturing of silica glass using laser stereolithography with a top-down approach and fast debinding." RSC advances 8.29 (May 3, 2018): 16344-16348. (Year: 2018).*
(Continued)

*Primary Examiner* — Benjamin A Schiffman
(74) *Attorney, Agent, or Firm* — Bayramoglu Law Offices LLC

(57) ABSTRACT

A preparation method and use of a yellow fluorescent glass ceramic are disclosed. The preparation method includes: mixing a monomer, a cross-linking agent and a filling solvent evenly, then adding fumed silica and stirring evenly, further adding an ultraviolet (UV) photoinitiator and an UV absorber, and stirring thoroughly; adding a yellow phosphor (Y,Gd)AG:Ce, stirring thoroughly and defoaming to obtain a slurry; introducing the slurry into a mold, and curing by UV irradiation or three-dimensional (3D) printing to obtain a body; putting the body into a high-temperature furnace for heating to obtain a phosphor-embedded porous silica glass; putting the porous silica glass into a high-temperature vacuum furnace for densification and sintering to obtain a densified fluorescent glass ceramic; and finally cutting and surface-polishing.

3 Claims, 4 Drawing Sheets

(51) Int. Cl.
  B29C 39/00      (2006.01)
  B29C 70/58      (2006.01)
  B33Y 70/10      (2020.01)
  B33Y 80/00      (2015.01)
  C03B 19/06      (2006.01)
  C03C 3/06       (2006.01)
  C03C 4/12       (2006.01)
  C04B 35/645     (2006.01)
  B33Y 10/00      (2015.01)
  B82Y 20/00      (2011.01)
  B82Y 40/00      (2011.01)

(52) U.S. Cl.
  CPC ............... *B33Y 70/10* (2020.01); *B33Y 80/00* (2014.12); *C03B 19/06* (2013.01); *C03C 3/06* (2013.01); *C03C 4/12* (2013.01); *C04B 35/645* (2013.01); *B29C 2035/0827* (2013.01); *B33Y 10/00* (2014.12); *B82Y 20/00* (2013.01); *B82Y 40/00* (2013.01); *C03C 2214/12* (2013.01); *C03C 2214/20* (2013.01); *C03C 2214/30* (2013.01); *C04B 2235/3418* (2013.01); *C04B 2235/42* (2013.01); *C04B 2235/602* (2013.01); *C04B 2235/65* (2013.01); *C04B 2235/9661* (2013.01)

(56) References Cited

OTHER PUBLICATIONS

Chen, Daqin, et al. "Advances in transparent glass-ceramic phosphors for white light-emitting diodes—A review." Journal of the European Ceramic Society 35.3 (Oct. 23, 2014): 859-869. (Year: 2014).*

Ikeda, Hiroshi, Shigeru Fujino, and Toshihisa Kajiwara. "Preparation of SiO2-PVA nanocomposite and monolithic transparent silica glass by sintering." Journal of the Ceramic Society of Japan 119.1385 (Jan. 1, 2011): 65-69. (Year: 2011).*

* cited by examiner

*Replacement Sheet of Fig. 5 and Fig. 6A*

PREPARATION METHOD AND USE OF YELLOW FLUORESCENT GLASS CERAMIC

CROSS REFERENCE TO THE RELATED APPLICATIONS

This application is the national phase entry of International Application No. PCT/CN2019/122037, filed on Nov. 29, 2019, which is based upon and claims priority to Chinese Patent Application No. 201910400469.7, filed on May 15, 2019, the entire contents of which are incorporated herein by reference.

TECHNICAL FIELD

The present invention relates to the technical fields of luminescent materials and three-dimensional (3D) printing, and specifically relates to a preparation method and use of a yellow fluorescent glass ceramic.

BACKGROUND

Light-emitting diode (LED) is recognized as the fourth-generation lighting source due to its advantages of low energy consumption, long service life and small size. Currently, the commercial white LED generally uses an InGaN blue chip to excite a yellow phosphor $(Y,Gd)_3Al_5O_{12}:Ce$ ((Y,Gd)AG:Ce), which is cured and packaged by using polymer materials such as epoxy resin and organic silicon resin. Because these polymer materials have low thermal conductivity and are easy to age at high temperature, the heat generated during the light-emitting process cannot be quickly diffused, causing problems such as low efficiency, color drift and short life of the white LED. These problems are particularly serious when a high-power blue chip or laser diode (LD) is used as the excitation light source. In order to improve the stability of the white LED and extend the use of the white LED in the luminescent material and solid-state lighting (SSL) fields and the high-power lighting and display fields, including street lamps, projection displays and automobile headlights, it is highly desirable to develop a phosphor conversion material with high thermal conductivity and excellent physical and chemical stability.

To this end, three alternatives to traditional phosphors have been proposed, including single crystals (CN100389504C), transparent ceramics (US20090105065, CN102249660B and CN102832328B) and glass ceramics (CN103496852B, CN107162427B and CN103159407B). The first two alternatives have high thermal conductivity and excellent physical and chemical stability, but they are complicated and costly. As for the third alternative, fluorescent glass ceramics are currently the focus of research in the field of luminescent materials due to their simple synthesis and high physical and chemical stability. In recent years, a variety of fluorescent glass ceramics (CN103496852B, CN107176791B and US20130334957A1) have been developed. These fluorescent glass ceramics have high internal quantum efficiency (IQE) (>70%) and low sintering temperature (<1,000° C.). However, their mother glass uses expensive components, and their physical and chemical stability is not adequate for the long-term operation of the LED device under high power, high heat and high humidity.

Quartz glass is a single-component (silicon dioxide) amorphous material. Due to the high chemical bond energy (Si—O) and compact structure, quartz glass has high ultraviolet (UV)/visible (V) light transmittance and excellent physical and chemical stability. The traditional fluorescent glass ceramic using quartz glass as the mother glass is prepared by mixing and sintering the phosphor with the glass powder. It has low quantum efficiency due to the strong corrosion effect of the quartz glass on the phosphor at the high temperature (>1,500° C.).

Wang Lianjun et al. prepared an efficient fluorescent glass ceramic by YAG:Ce and a silicon-based mesoporous material by spark plasma sintering (SPS) (CN103159407B). This preparation method relies on a strong current and a high voltage to inhibit the corrosion of the phosphor from the mother glass. It requires expensive equipment, and is limited in the sample size and shape (block only), which greatly affects its production and use.

Three-dimensional (3D) printing is a technology of constructing an object from a digital model by adding a curable, adhesive or fused material such as fluid or powder layer by layer. 3D printing can achieve rapid and personalized manufacturing and create shapes that cannot be completed by traditional manufacturing. It has been widely used in mold manufacturing, industrial design and other fields. The present invention applies 3D printing to quickly prepare a fluorescent glass ceramic with large size, complex shape, high quantum efficiency and excellent physical and chemical stability, and uses the fluorescent glass ceramic in high-power LED or LD lighting and display.

SUMMARY

In order to overcome the shortcomings in the prior art, an objective of the present invention is to provide a preparation method of a yellow fluorescent glass ceramic. This method integrates three-dimensional (3D) printing to quickly prepare a fluorescent glass ceramic with large size, complex shape, high quantum efficiency and excellent physical and chemical stability.

The present invention adopts the following technical solutions:

(1) slurry preparation:
   mixing 55-75 parts by volume of monomer, 1-8 parts by volume of cross-linking agent and 15-40 parts by volume of filling solvent evenly to obtain a mixed solution; then adding fumed silica and stirring evenly, where a volume ratio of the fumed silica to the mixed solution is 3:7 to 5:5; further adding 0.05-1 wt % of ultraviolet (UV) photoinitiator and 0.002-0.05 wt % of UV absorber, and stirring thoroughly; finally adding a yellow phosphor (Y,Gd)AG:Ce, stirring thoroughly and defoaming to obtain a slurry, where a mass ratio of the yellow phosphor to the fumed silica is 1:100 to 15:100;

(2) curing: introducing the slurry into a mold with a desired shape, and curing by irradiating with an UV lamp for 20-60 s or printing with a light-curing 3D printer to obtain a body;

(3) degreasing: putting the body into a high-temperature furnace, slowly heating to 600-1,000° C., holding in the air for 1-10 h to fully decompose and discharge organic matter, and obtaining a phosphor-embedded porous silica glass as a porous precursor;

(4) sintering: putting the porous precursor in a high-temperature vacuum furnace, and performing densification and sintering at 1,050-1,300° C. under vacuum for 0.5-6 h to obtain a densified fluorescent glass ceramic; and (5) polishing: cutting and surface-polishing the fluorescent glass ceramic to obtain a yellow fluorescent glass ceramic with a desired size or a dense yellow fluorescent glass ceramic with a specific shape.

Preferably, the monomer includes at least one selected from the group consisting of hydroxyethyl methacrylate, hydroxyethyl acrylate and 4-hydroxybutyl acrylate.

Preferably, the cross-linking agent includes at least one selected from the group consisting of polyethylene glycol 200 dibenzoate and polyethylene glycol 400 dibenzoate.

Preferably, the filling solvent includes at least one selected from the group consisting of diethylene glycol dibenzoate, phenoxyethanol and ethyl benzoate.

Preferably, the UV photoinitiator includes at least one selected from the group consisting of 819, 651, 184, and 1173.

Preferably, the UV absorber includes at least one selected selected from the group consisting of 1130, 384, 400 and Sudan red G.

Preferably, an average particle size of the fumed silica is not greater than 50 nm.

The densification and sintering is performed under vacuum at 0.1 Pa, and the vacuum condition can be achieved by using a rotary vane vacuum pump.

In the present invention, the high-temperature vacuum furnace in step (4) is an ordinary furnace, which does not require a high pressure of plasma, but only requires a vacuum pressure of 0.1 Pa. That is, the preparation of the yellow fluorescent glass ceramic can be achieved at a vacuum pressure of 0.1 Pa, without the need for a lower vacuum pressure with a higher precision.

The molding of the body is not limited to the light curing method, and a thermal curing method may also be used. A light curing agent is changed to a thermal curing agent; moreover, the slurry in step (1) is prepared by directly mixing polyvinyl alcohol (PVA) with the fumed silica and molded by thermal curing.

The yellow fluorescent glass ceramic prepared by the present invention is used in solid-state lighting (SSL) and display based on a high-power blue LED or laser diode (LD).

The high power refers to an excitation light power density greater than 1 W/mm$^2$.

The body molding method provided by the present invention is a light curing method. However, the molding of the body may also be completed by using a thermal curing method by changing the light curing agent used in step (1) to a thermal curing agent. Moreover, the slurry in step (1) is prepared by directly mixing PVA with the fumed silica and molded and thermal cured.

The fluorescent glass ceramic of the present invention can be prepared with a desired complex shape and a size of several centimeters through 3D printing.

The yellow fluorescent glass ceramic of the present invention has excellent chemical stability, and can withstand high-density excitation light irradiation for a long time under high-heat and high-humidity conditions without degeneration.

The yellow fluorescent glass ceramic of the present invention can be directly packaged with a semiconductor SSL source to obtain a high-brightness white LED device.

The present invention has the following beneficial effects:

The preparation method of the yellow fluorescent ceramic glass ceramic of the present invention does not require special experimental conditions such as external pressure, strong current and high vacuum, has low requirements on the sintering equipment, and is simple and inexpensive to synthesize.

In addition, the slurry prepared by the present invention can be quickly molded through 3D printing into various fluorescent glass ceramics with complex shapes, such as common hemispherical shape, bulb shape and lamp tube shape. In addition, the quartz glass has a very low thermal expansion coefficient, high thermal conductivity and excellent physical and chemical stability. Therefore, the present invention can package a high-power white LED device with excellent stability, which meets the requirements for optical optimization and artistic design and truly realizes the integration of a phosphor converter and a lampshade.

DETAILED DESCRIPTION OF THE EMBODIMENTS

Figure 1:
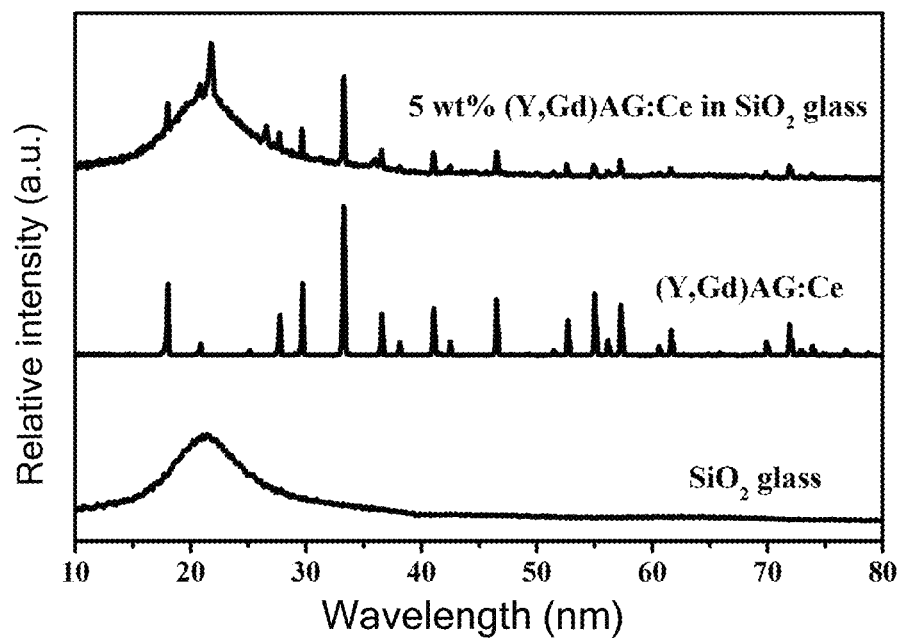
FIG. 1 shows an X-ray diffraction (XRD) spectrum of a yellow fluorescent glass ceramic according to Example 2 of the present invention.

The present invention is described in more detail below with reference to the accompanying drawings and specific examples.

The examples of the present invention will be described below.

The yellow phosphor (Y,Gd)AG:Ce, nano-grade fumed silica and other organic raw materials used in the examples are all commercially available.

Example 1

67 vol % of hydroxyethyl methacrylate, 3 vol % of polyethylene glycol 200 dibenzoate and 30 vol % of diethylene glycol dibenzoate were mixed evenly to obtain a solution. Then fumed silica with an average particle size of 50 nm was added and stirred evenly, where a volume ratio of the fumed silica to the solution was 4:6. Then 0.05 wt % of ultraviolet (UV) photoinitiator 819 and 0.03 wt % of UV absorber Sudan red G were added and stirred thoroughly. Finally, a yellow phosphor (Y,Gd)AG:Ce was added, stirred thoroughly and defoamed to obtain a slurry, where a mass ratio of the yellow phosphor to the fumed silica was 1:100.

The slurry was introduced into a silicone mold and irradiated under a 1,000 W 365 nm UV lamp for 20 s for curing to obtain a body. The body was put into a high-temperature box furnace, and slowly heated to 800° C. by 1° C./min. Then it was held in the air for 3 h to fully decompose and discharge organic matter, thus obtaining a phosphor-embedded porous silica glass as a porous precursor.

The porous precursor was put into a high-temperature vacuum furnace. It was sintered at 1,250° C. under vacuum (about 0.1 Pa) for 2 h to obtain a densified fluorescent glass ceramic. The densified fluorescent glass ceramic was cut and surface-polished to obtain fluorescent glass ceramic sheets of different sizes.

Example 2

67 vol % of hydroxyethyl methacrylate, 3 vol % of polyethylene glycol 200 dibenzoate and 30 vol % of diethylene glycol dibenzoate were mixed evenly to obtain a solution. Then fumed silica with an average particle size of 50 nm was added and stirred evenly, where a volume ratio of the fumed silica to the solution was 4:6. Then 0.05 wt % of ultraviolet (UV) photoinitiator 819 and 0.03 wt % of UV absorber Sudan red G were added and stirred thoroughly. Finally, a yellow phosphor (Y,Gd)AG:Ce was added, stirred thoroughly and defoamed to obtain a slurry, where a mass ratio of the yellow phosphor to the fumed silica was 5:100.

The slurry was introduced into a silicone mold and irradiated under a 1,000 W 365 nm UV lamp for 20 s for curing to obtain a body. The body was put into a high-temperature box furnace, and slowly heated to 800° C. by 1° C./min. Then it was held in the air for 3 h to fully decompose and discharge organic matter, thus obtaining a phosphor-embedded porous silica glass as a porous precursor.

The porous precursor was put into a high-temperature vacuum furnace. It was sintered at 1,250° C. under vacuum (0.1 Pa) for 2 h to obtain a densified fluorescent glass ceramic. The densified fluorescent glass ceramic was cut and surface-polished to obtain fluorescent glass ceramic sheets of different sizes. An internal quantum efficiency (IQE) of the fluorescent glass ceramic prepared in this example was 73%. The fluorescent glass ceramic sheet was put into a high-pressure hydrothermal kettle for an accelerated aging test, using deionized water as a solvent. After the fluorescent glass ceramic sheet was reacted at 200° C. for 10 h, its luminous intensity did not change, and the glass matrix remained intact.

FIG. 1 is an X-ray diffraction (XRD) spectrum of a sample prepared in this example. It can be seen from FIG. 1 that the fluorescent glass ceramic had both a cubic crystal phase of YAG and an amorphous phase of quartz glass.

Figure 2:
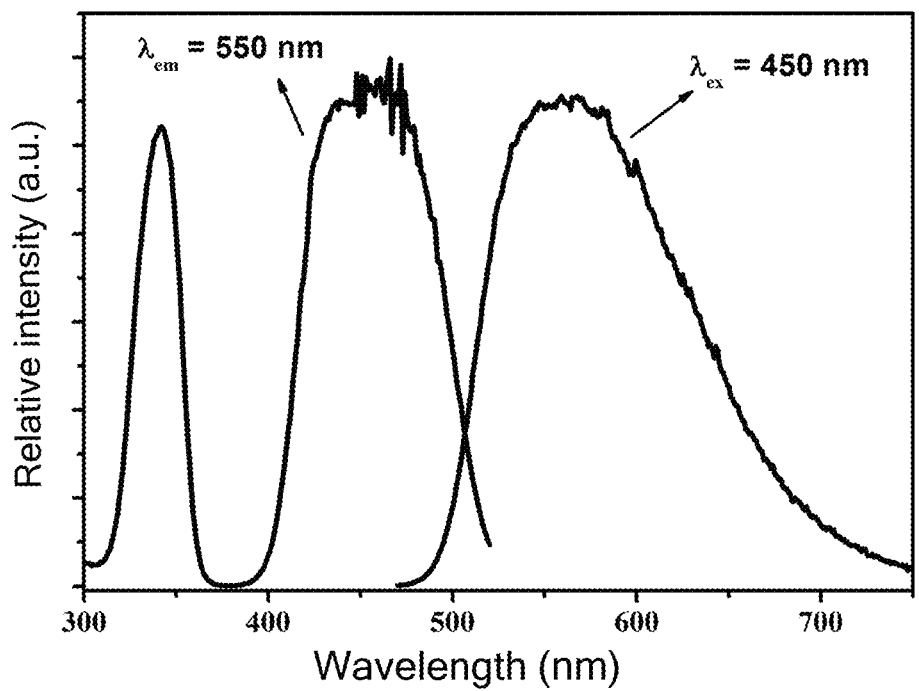
FIG. 2 shows excitation and emission spectra of the yellow fluorescent glass ceramic according to Example 2 of the present invention.

FIG. 2 shows excitation and emission spectra of a sample prepared in this example. It can be seen from FIG. 2 that the fluorescent glass ceramic emitted broadband yellow light with a peak wavelength of 550 nm under the excitation of blue light at 420-500 nm.

Figure 3:
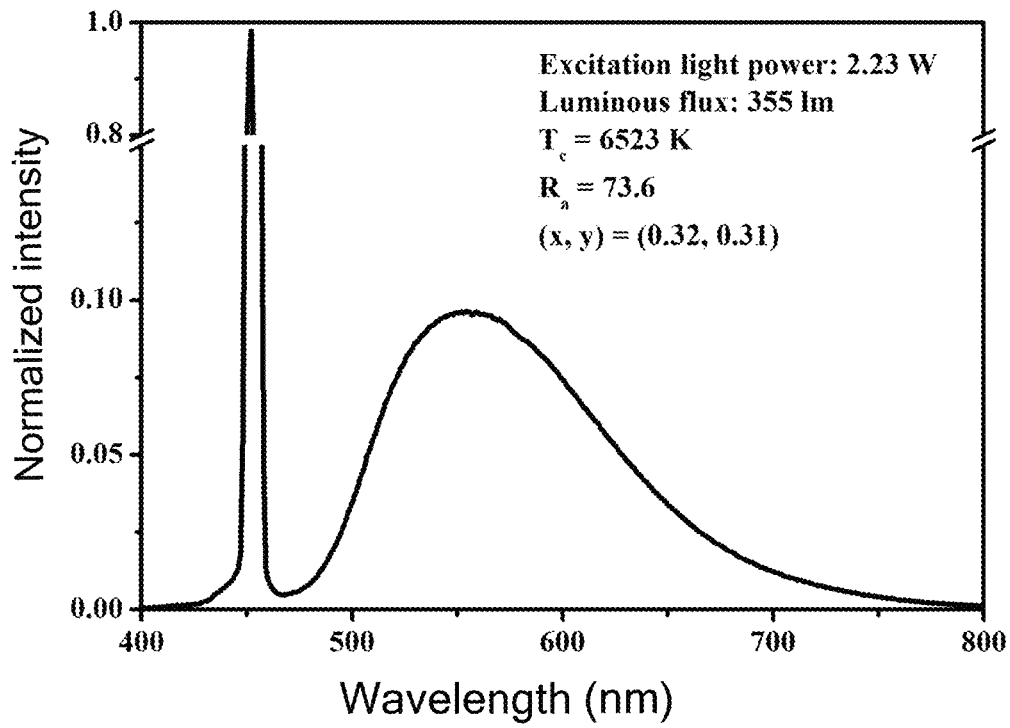
FIG. 3 shows a spectrum and parameters of a white light-emitting diode (LED) device packaged with the yellow fluorescent glass ceramic and a blue laser diode (LD) according to Example 2 of the present invention.

FIG. 3 shows a spectrum and parameters of a high-power white LED device packaged with the fluorescent glass ceramic sheet prepared in this example and a power-tunable blue LD. Under the excitation of 2.23 W light, the device emitted white light of 355 lm, with a correlated color temperature (CCT, Tc) of 6,523, a color rendering index (CRI, Ra) of 73.6 and coordinates of (0.32,0.31) in a Commission Internationale d'Eclairage (CIE) system.

Figure 4:
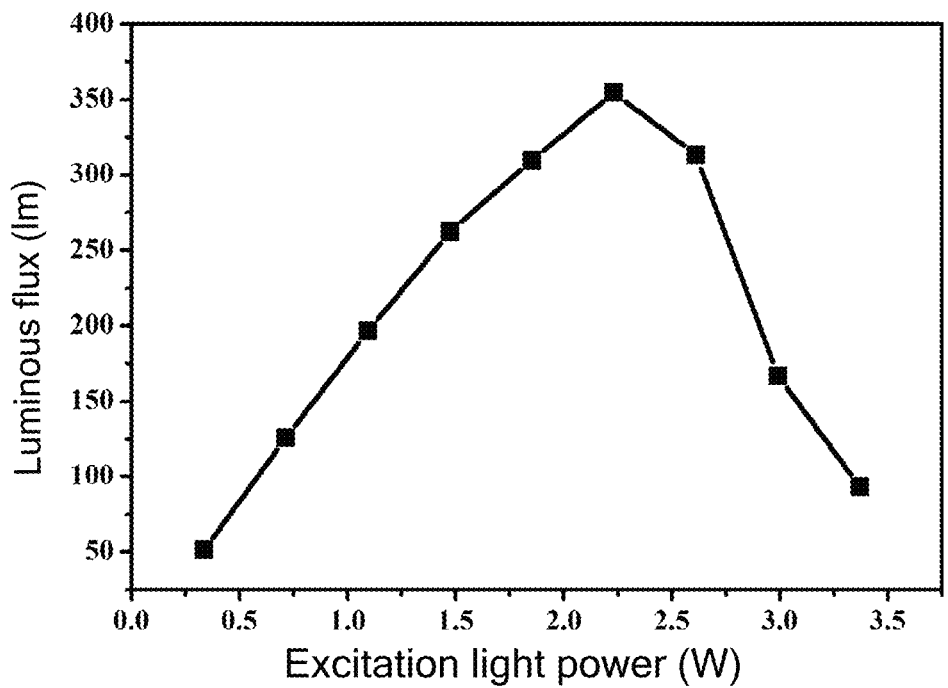
FIG. 4 shows a variation of a luminous flux of the white LED device packaged with the yellow fluorescent glass ceramic and the blue LD as a function of an excitation light power according to Example 2 of the present invention.

FIG. 4 shows a variation of a luminous flux of the white LED device with an excitation light power.

Example 3

67 vol % of hydroxyethyl methacrylate, 3 vol % of polyethylene glycol 200 dibenzoate and 30 vol % of diethylene glycol dibenzoate were mixed evenly to obtain a solution. Then fumed silica with an average particle size of 50 nm was added and stirred evenly, where a volume ratio of the fumed silica to the solution was 4:6. Then 0.05 wt % of ultraviolet (UV) photoinitiator 819 and 0.03 wt % of UV absorber Sudan red G were added and stirred thoroughly. Finally, a yellow phosphor (Y,Gd)AG:Ce was added, stirred thoroughly and defoamed to obtain a slurry, where a mass ratio of the yellow phosphor to the fumed silica was 15:100.

The slurry was introduced into a silicone mold and irradiated under a 1,000 W 365 nm UV lamp for 20 s for curing to obtain a body. The body was put into a high-temperature box furnace, and slowly heated to 800° C. by 1° C./min. Then it was held in the air for 3 h to fully decompose and discharge organic matter, thus obtaining a phosphor-embedded porous silica glass as a porous precursor.

The porous precursor was put into a high-temperature vacuum furnace. It was sintered at 1,250° C. under vacuum (0.1 Pa) for 2 h to obtain a densified fluorescent glass ceramic. The densified fluorescent glass ceramic was cut and surface-polished to obtain fluorescent glass ceramic sheets of different sizes.

Example 4

67 vol % of hydroxyethyl methacrylate, 3 vol % of polyethylene glycol 200 dibenzoate and 30 vol % of diethylene glycol dibenzoate were mixed evenly to obtain a solution. Then fumed silica with an average particle size of 10 nm was added and stirred evenly, where a volume ratio of the fumed silica to the solution was 4:6. Then 0.05 wt % of ultraviolet (UV) photoinitiator 819 and 0.03 wt % of UV absorber Sudan red G were added and stirred thoroughly. Finally, a yellow phosphor (Y,Gd)AG:Ce was added, stirred thoroughly and defoamed to obtain a slurry, where a mass ratio of the yellow phosphor to the fumed silica was 5:100.

The slurry was introduced into a silicone mold and irradiated under a 1,000 W 365 nm UV lamp for 20 s for curing to obtain a body. The body was put into a high-temperature box furnace, and slowly heated to 800° C. by 1° C./min. Then it was held in the air for 3 h to fully decompose and discharge organic matter, thus obtaining a phosphor-embedded porous silica glass as a porous precursor.

The porous precursor was put into a high-temperature vacuum furnace. It was sintered at 1,150° C. under vacuum (0.1 Pa) for 2 h to obtain a densified fluorescent glass ceramic. The densified fluorescent glass ceramic was cut and surface-polished to obtain fluorescent glass ceramic sheets of different sizes.

Example 5

67 vol % of hydroxyethyl methacrylate, 3 vol % of polyethylene glycol 200 dibenzoate and 30 vol % of diethylene glycol dibenzoate were mixed evenly to obtain a solution. Then fumed silica with an average particle size of 10 nm was added and stirred evenly, where a volume ratio of the fumed silica to the solution was 4:6. Then 0.05 wt % of ultraviolet (UV) photoinitiator 819 and 0.03 wt % of UV absorber Sudan red G were added and stirred thoroughly. Finally, a yellow phosphor (Y,Gd)AG:Ce was added, stirred thoroughly and defoamed to obtain a slurry, where a mass ratio of the yellow phosphor to the fumed silica was 5:100.

The slurry was introduced into a silicone mold and irradiated under a 1,000 W 365 nm UV lamp for 20 s for curing to obtain a body. The body was put into a high-temperature box furnace, and slowly heated to 800° C. by 1° C./min. Then it was held in the air for 3 h to fully decompose and discharge organic matter, thus obtaining a phosphor-embedded porous silica glass as a porous precursor.

The porous precursor was put into a high-temperature vacuum furnace. It was sintered at 1,150° C. under vacuum (0.1 Pa) for 2 h to obtain a densified fluorescent glass ceramic. The densified fluorescent glass ceramic was cut and surface-polished to obtain fluorescent glass ceramic sheets of different sizes.

Example 6

67 vol % of hydroxyethyl methacrylate, 3 vol % of polyethylene glycol 200 dibenzoate and 30 vol % of diethylene glycol dibenzoate were mixed evenly to obtain a solution. Then fumed silica with an average particle size of 50 nm was added and stirred evenly, where a volume ratio of the fumed silica to the solution was 4:6. Then 0.05 wt % of ultraviolet (UV) photoinitiator 819 and 0.03 wt % of UV absorber Sudan red G were added and stirred thoroughly. Finally, a yellow phosphor (Y,Gd)AG:Ce was added, stirred thoroughly and defoamed to obtain a slurry, where a mass ratio of the yellow phosphor to the fumed silica was 5:100.

The slurry was introduced into a feeder of a liquid crystal display (LCD) light-curing 3D printer (with a light source having a wavelength of 405 nm), and a pre-designed shape (such as a hat shape shown in FIG. 6C) and a pre-designed size were printed out through software control. The body was put into a high-temperature box furnace, and slowly heated to 600° C. by 1° C./min. Then it was held in the air for 3 h to fully decompose and discharge organic matter, thus obtaining a phosphor-embedded porous silica glass as a porous precursor.

The porous precursor was put into a high-temperature vacuum furnace. It was sintered at 1,250° C. under vacuum (0.1 Pa) for 2 h to obtain a densified fluorescent glass ceramic. The densified fluorescent glass ceramic was polished to obtain a fluorescent glass ceramic converter with a complex shape, where an IQE of the fluorescent glass ceramic convert was 79%.

Figure 5:
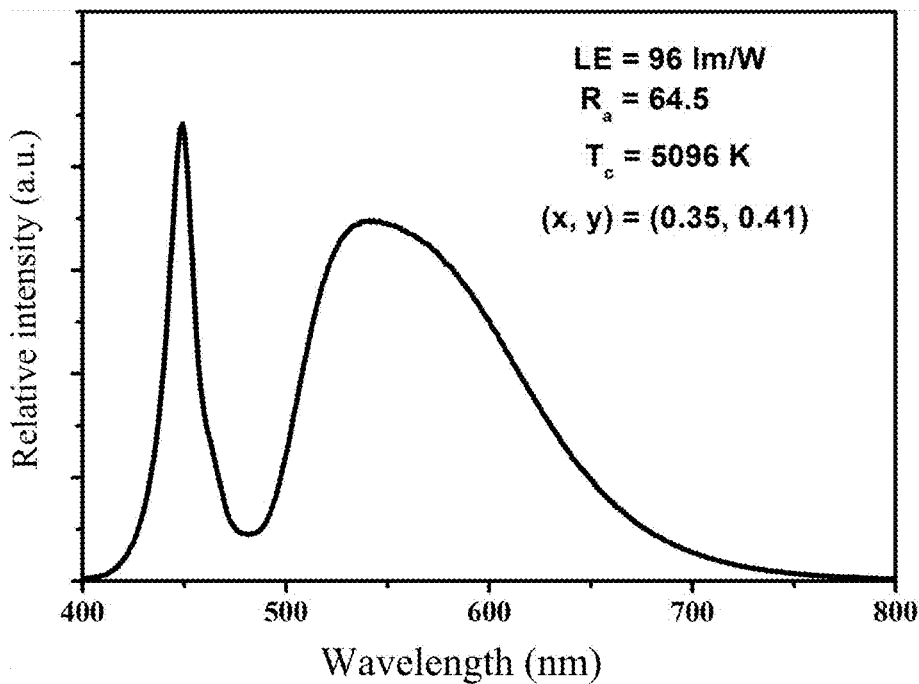
FIG. 5 shows an electroluminescence spectrum and parameters of a white LED device according to Example 6 of the present invention.
Figure 6A:
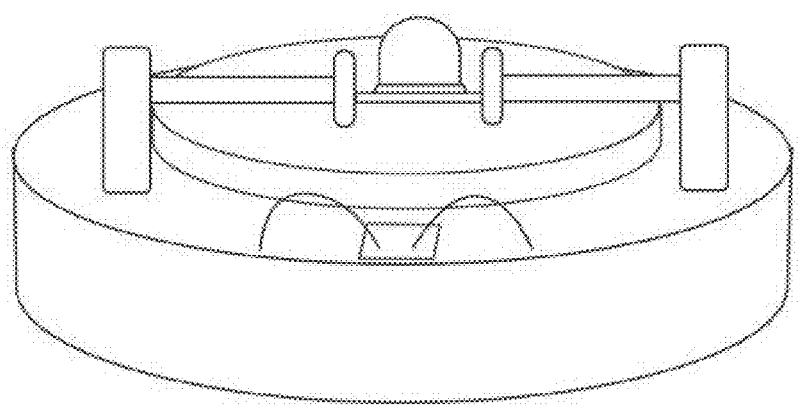
FIG. 6A shows a fluorescent glass ceramic converter prepared in Example 6 of the present invention.
Figure 6B:
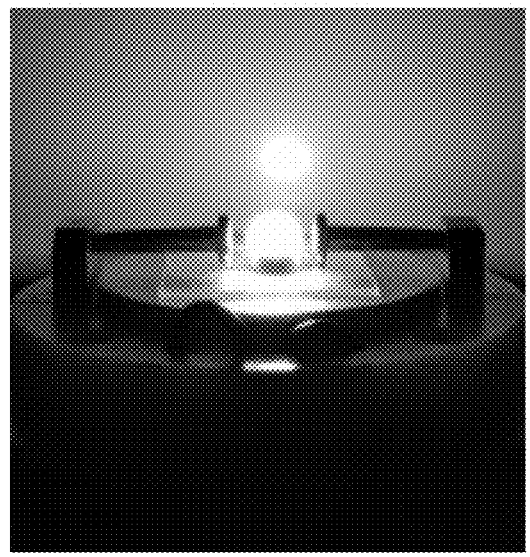
FIG. 6B shows a white LED device packaged with the fluorescent glass ceramic converter prepared in Example 6 of the present invention.
Figure 6C:
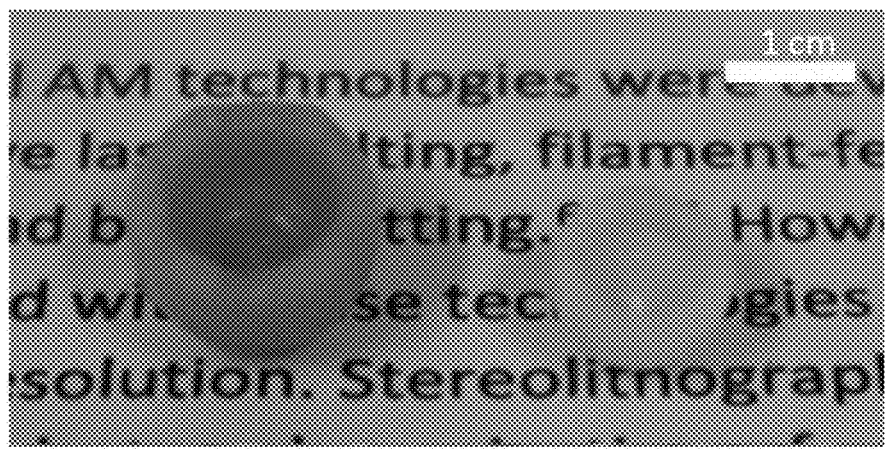
FIG. 6C shows a hat-shaped body prepared in Example 6 of the present invention.

FIGS. 6A-C shows a hat-shaped body and a fluorescent glass ceramic converter prepared in this example and a white LED device packaged with the fluorescent glass ceramic converter. A bottom size of the hat-shaped fluorescent glass ceramic converter was designed to be the same as a commercially available 1 W blue chip, so it could be directly used for packaging a white LED device. FIG. 5 shows an electroluminescence spectrum and parameters of the white LED device. The device had a luminous efficiency (LE) of 96 lm/W, a CCT (Tc) of 5,096, a CRI (Ra) of 64.5 and coordinates of (0.35,0.41) in a CIE system.

Obviously, the above examples are merely intended to clearly describe the present invention, and other changes or alterations may be made on the basis of the above description. Therefore, obvious changes or alterations made accordingly should still fall within the protection scope of the claims of the invention. In the preparation method for a yellow fluorescent glass ceramic provided by the present invention, the organic solvent used is a light-curing organic solvent. However, a thermal-curing organic solvent may also be used, and the desired body may be obtained by thermal curing.

It can be seen from the implementations of the present invention that the method of the present invention has a simple process and integrates 3D printing to quickly prepare a fluorescent glass ceramics with a complex shape and stable physical and chemical properties. The yellow fluorescent glass ceramic can be packaged with a high-power LED or LD to form a high-brightness white LED device, which can be used in high-power lighting and display.

What is claimed is:

1. A preparation method of a yellow fluorescent glass ceramic, comprising the following steps:
   (1) a slurry preparation: mixing a monomer, a cross-linking agent and a filling solvent evenly to obtain a mixed solution; then adding fumed silica to the mixed solution to obtain a first mixture, and stirring the first mixture evenly, wherein a volume ratio of the fumed silica to the mixed solution is 3:7 to 5:5; further adding 0.05-1 wt % of an ultraviolet (UV) photoinitiator and 0.002-0.05 wt % of a UV absorber to the first mixture to obtain a second mixture, and stirring the second mixture thoroughly; finally adding a yellow phosphor (Y,Gd) AG: Ce to the second mixture to obtain a third mixture, stirring thoroughly and defoaming the third mixture to obtain a slurry, wherein a mass ratio of the yellow phosphor to the fumed silica is 1:100 to 15:100, wherein the monomer comprises at least one selected from the group consisting of hydroxyethyl acrylate and 4-hydroxybutyl acrylate, wherein the cross-linking agent comprises polyethylene glycol 400 dibenzoate, and wherein the average particle size of the fumed silica is 10 nm;
   (2) a curing: introducing the slurry into a mold with a predetermined shape, and curing the slurry by an irradiating with an UV lamp for 20-60 s;
   (3) a degreasing: putting the body into a high-temperature furnace, heating the body to 600-1,000° C., holding the body in air for 1-10 h to fully decompose and discharge organic matter, and obtaining a phosphor-embedded porous silica glass as a porous precursor;
   (4) a sintering: putting the porous precursor in a high-temperature vacuum furnace, and performing a densification and the sintering on the porous precursor at 1,050-1,300° C. under vacuum for 0.5-6 h to obtain a densified fluorescent glass ceramic; and
   (5) a polishing: cutting and surface-polishing the densified fluorescent glass ceramic to obtain the yellow fluorescent glass ceramic with a predetermined size.

2. The preparation method of the yellow fluorescent glass ceramic according to claim 1, wherein
in step (1), 55-75 parts by volume of the monomer, 1-8 parts by volume of the cross-linking agent and 15-40 parts by volume of the filling solvent are mixed evenly.

3. The preparation method of the yellow fluorescent glass ceramic according to claim 1, wherein
the filling solvent comprises at least one selected from the group consisting of diethylene glycol dibenzoate, phenoxyethanol and ethyl benzoate.

* * * * *